United States Patent
Thelen et al.

(10) Patent No.: US 12,453,535 B2
(45) Date of Patent: Oct. 28, 2025

(54) SINGLE SENSOR TENSIOMETER

(71) Applicant: Wisconsin Alumni Research Foundation, Madison, WI (US)

(72) Inventors: Darryl Gerard Thelen, Madison, WI (US); Dylan Gerald Schmitz, Oregon, WI (US); Stephanie Grace Cone, Newark, DE (US)

(73) Assignee: Wisconsin Alumni Research Foundation, Madison, WI (US)

( * ) Notice: Subject to any disclaimer, the term of this patent is extended or adjusted under 35 U.S.C. 154(b) by 72 days.

(21) Appl. No.: 18/203,216

(22) Filed: May 30, 2023

(65) Prior Publication Data
US 2024/0398380 A1    Dec. 5, 2024

(51) Int. Cl.
*A61B 8/00* (2006.01)
*A61B 8/08* (2006.01)

(52) U.S. Cl.
CPC .............. *A61B 8/485* (2013.01); *A61B 8/08* (2013.01); *A61B 8/5223* (2013.01)

(58) Field of Classification Search
None
See application file for complete search history.

(56) References Cited

U.S. PATENT DOCUMENTS

| | | | |
|---|---|---|---|
| 10,631,775 B2 | 4/2020 | Thelen et al. | |
| 2004/0249580 A1* | 12/2004 | Pourcelot | A61B 8/08 702/43 |
| 2005/0054930 A1* | 3/2005 | Rickets | G01S 7/52042 600/453 |
| 2013/0237820 A1 | 9/2013 | Vappou et al. | |
| 2014/0081136 A1 | 3/2014 | Zhao et al. | |
| 2015/0148675 A1* | 5/2015 | Haupt | A61B 8/5223 600/438 |
| 2017/0128000 A1 | 5/2017 | Martin et al. | |
| 2017/0367683 A1 | 12/2017 | Zheng et al. | |
| 2019/0200900 A1 | 7/2019 | Thelen et al. | |
| 2021/0145608 A1* | 5/2021 | Herr | A61B 8/0825 |
| 2021/0386299 A1* | 12/2021 | Hocking | A61B 8/4427 |
| 2023/0052280 A1 | 2/2023 | Martin et al. | |

OTHER PUBLICATIONS

Schmitz et al., "A Kalman Filter Approach for Estimating Tendon Wave Speed from Skin-Mounted Accelerometers," (Mar. 16, 2022), Sensors (Basel), 22(6):2283. (Year: 2022).*

Schneebeli et al., "Measurement of Achilles tendon loading using shear wave tensiometry: A reliability study," (Dec. 2022), Musculoskeletal Science and Practice, vol. 62. (Year: 2022).*

(Continued)

*Primary Examiner* — Keith M Raymond
*Assistant Examiner* — Ashish S Jasani
(74) *Attorney, Agent, or Firm* — Boyle Fredrickson, SC

(57) ABSTRACT

An apparatus for measuring forces in connective tissue employs a single sensor receiving a shear wave, band-limited, wavelet signal from an actuator and processing it to determine a delay for the determination of shear wave speed and related tension or force. Delay may be a combined analysis of a group delay of the wavelet and a phase delay of the wavelet.

18 Claims, 2 Drawing Sheets

(56) References Cited

OTHER PUBLICATIONS

Wakker et al., "Elasticity standard values of the Achilles tendon assessed with acoustic radiation force impulse elastography on healthy volunteers: a cross section study teaches," (May 9, 2018), BMC Musculoskeletal Disorders vol. 19, Article No. 139. (Year: 2018).*

Wang et al., "A non-invasive technique for estimating carpal tunnel pressure by measuring shear wave speed in tendon: A feasibility study," (Nov. 15, 2012), Journal of Biomechanics, vol. 45, Issue 16, pp. 2927-2930. (Year: 2012).*

Lu et al., "Longitudinal shear wave elasticity measurements of millimeter-sized biomaterials using a single-element transducer platform," (Apr. 6, 2022), PLoS One;17(4):e0266235). (Year: 2022).*

International Search Report for PCT/US2024/028486 mailing date Aug. 26, 2024.

Buhlmann et al.; "Ion-selective electrodes with ionophore-doped sensing membranes." Supramolecular Chemistry: From Molecules to Nanomaterials 5 (2012): pp. 2539-2579. US.

Ali et al.; "Continuous monitoring of soil nitrate using a miniature sensor with poly (3-octyl-thiophene) and molybdenum disulfide nanocomposite." ACS applied materials & interfaces 11, No. 32 (2019): pp. 1-38. US.

Baumbauer et al.; "Printed Potentiometric Nitrate Sensors for Use in Soil." Sensors 22, No. 11 (2022): 4095; pp. 1-13. US.

* cited by examiner

SINGLE SENSOR TENSIOMETER

STATEMENT REGARDING FEDERALLY SPONSORED RESEARCH OR DEVELOPMENT

This invention was made with government support under CBET2019621 awarded by the National Science Foundation. The government has certain rights in the invention.

CROSS REFERENCE TO RELATED APPLICATION

Background of the Invention

The present invention relates to an apparatus for measuring tissue loads (e.g., stress, tension, or the like) using shear waves through the tissue including ligaments, tendon and muscle tissue and, in particular, to an improved apparatus for making such measurements.

The ability to measure the absolute stress that ligaments, tendons, or muscle experience in vivo has considerable value in medical research and rehabilitative medicine. Prior techniques used in research settings are highly invasive and include insertion of a "buckle transducer" in series with the tissue or the threading of a fiber optic sensor through the tissue and detecting changes in light transmission associated with tension. Tissue stress can often be inferred from measurements of force (e.g., torque) applied to a limb and using inverse dynamics to assess results of that applied force on the tissue. Tissue cross-sections can then be measured to convert the force to a stress value. This approach is cumbersome, however, and greatly restricts the availability of these measurements outside of laboratory environments.

U.S. Pat. No. 10,631,775, entitled "Apparatus for Dynamic Stress Measurement," assigned to the present assignee and hereby incorporated by reference, describes a method for characterizing relative stress in ligaments, tendons, and muscles using the propagation of a shear wave generated by a contact actuator as a shear wave passes between two spaced sensors.

The above described technique presents two challenges. The first relates to the dispersion of the acoustic signal caused by the frequency dependent nature of wave propagation in layered media representative of soft tissues. The inventors have determined that dynamic loading conditions during movement of the individual can cause changes in the dominant wave frequencies transmitted by the tissue that can introduce variability into the measured wave speeds. The second challenge is that the overall footprint of the device (~30 mm) is not suitable for many important ligaments and tendons with short free lengths.

SUMMARY OF THE INVENTION

The present invention provides a compact shear wave sensor that employs a single sensor/actuator pair to provide a smaller skin contact footprint suitable for a wider variety of tissue measurements. Improved accuracy with a single sensor is obtained by employing a shaped wavelet excitation whose delay characteristics (group delay and frequency delay) offer more robust shear wave transit time measurements with reduced frequency dependent variability. This is an improvement over prior impulsive excitation which results in broadband excitation.

In one embodiment, the invention provides an apparatus for measuring forces in connective tissue and includes at least one support adapted to attach to an individual at a location of connective tissue. The at least one support may hold a transducer probe which receives a transmission waveform signal to generate a predefined excitation in the connective tissue at a transmission time to generate a shear wavelet that travels longitudinally along the connective tissue from a first location. A motion sensor, also held by the at least one support, detects a reception waveform signal of the wavelet in the tissue at a reception time at a second location separated by a predetermined longitudinal distance from the first location. A processing circuit operates to determine a wavelet delay from the transmission waveform signal and the reception waveform signal, and, based on the wavelet delay, output a measure of wave speed as a proxy for connective tissue force.

It is thus a feature of at least one embodiment of the invention to provide a more compact shear wave sensor operable with only a single motion sensor that nevertheless provides acceptable accuracy for clinically relevant tissue force determinations.

The wavelet delay may be a function of a group delay describing transmission time of an envelope of the wavelet.

It is thus a feature of at least in one embodiment of the invention to represent broadband wave propagation by tracking group delay.

The measure of wavelet delay may further be a function of phase delay between a given frequency component of the transmission waveform signal and a corresponding given frequency component of the reception waveform signal.

It is thus a feature of at least one embodiment of the invention to provide a phase delay measurement believed to be more robust against frequency dispersion effects.

The given frequency component and corresponding given frequency component may be a wavelet frequency.

It is thus a feature of at least one embodiment of the invention to provide a narrow-band measurement having reduced susceptibility to tissue frequency dependency effects.

The processing circuit may operate to repeatedly determine a series of wavelet delays from a corresponding series of transmission waveform signals and reception waveform signals and may apply an adaptive filter to the wavelet delays to provide the measure of connective tissue force. In one embodiment, the adaptive filter may be a Kalman filter.

It is thus a feature of at least one embodiment of the invention to provide an apparatus that can produce a stream of reliable real time force measurements for kinematic studies.

The processing circuit may further operate to adjust the transmission waveform signal to compensate for delays introduced by the transducer probe prior to determining wavelet delay.

It is thus a feature of at least one embodiment of the invention to allow single-sensor operation by accurately determining actual shear wave initiation time from the transducer probe.

The wavelet transmission signal maybe a multi-lobed, time-limited sine wave.

It is thus a feature of at least one embodiment of the invention to provide a narrow band, shaped, shear wave signal offering improved transit time measurement.

The output measure of connective forces may be from the group consisting of stress and tension.

It is thus a feature of at least one embodiment of the invention to provide different forms of force measurement consistent with various tasks where tissue loading must be assessed.

These particular objects and advantages may apply to only some embodiments falling within the claims and thus do not define the scope of the invention.

DETAILED DESCRIPTION OF THE PREFERRED EMBODIMENT

Figure 1:
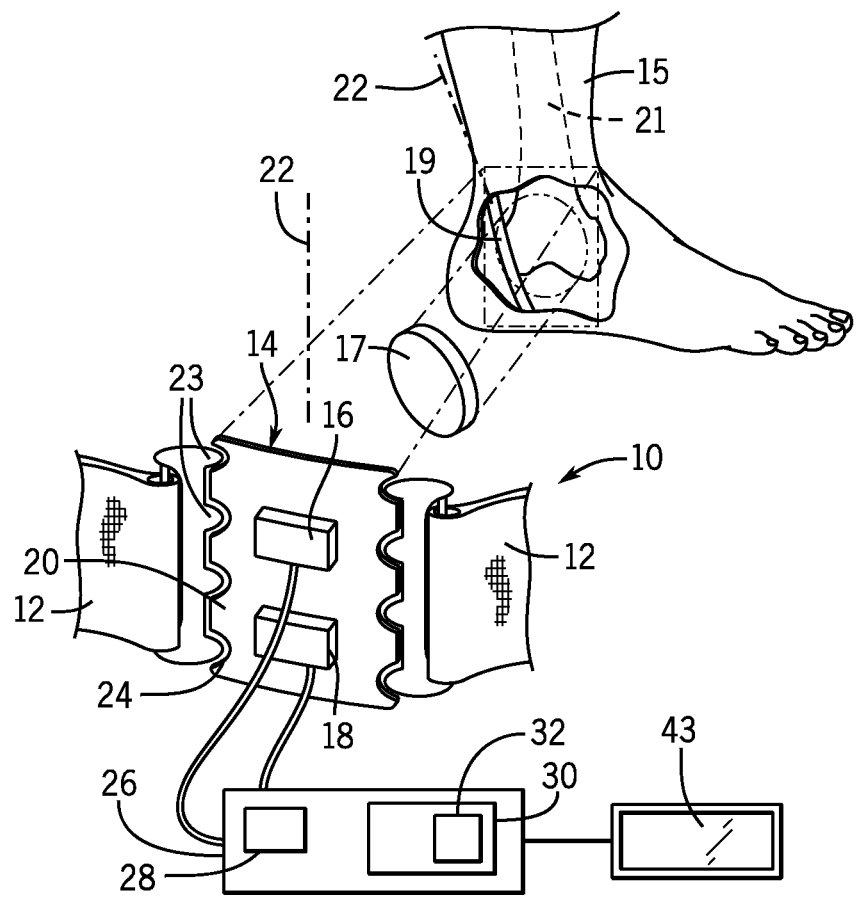
FIG. 1 is an exploded, fragmentary view of the transducer and motion sensor assembly per one embodiment of the present invention as may be positioned, in one example, next to a short peroneal tendon near the fibula, the actuator and sensor communicating with a controller executing a stored program.

Referring now to FIG. 1, a tissue measuring apparatus 10 constructed according to one embodiment of the present invention may provide an elastic cuff 12. The elastic cuff 12 is sized and shaped to support a sensor assembly 14 against the skin of an individual 15 proximate to tissue 19 such as a ligament, muscle, or tendon to be measured. In one nonlimiting example, the tissue 19 may be the peroneal tendons in the ankle proximate to the fibula 21.

The sensor assembly 14 may include a transducer probe 16 (or stimulator probe) and motion sensor 18 held at a predetermined fixed separation and generally aligned along an axis 22 of extension which may in turn be aligned with a longitudinal axis of the tissue 19 along which force will be determined. The predetermined fixed separation of the transducer probe 16 and motion sensor 18 may, for example, be less than 30 mm and in many cases from 15 to 25 mm.

In one embodiment, the transducer probe 16 and motion sensor 18 are supported on a flexible sound dampening sheet 20. The sheet 20 may flexibly bias the inner surfaces of the transducer probe 16 and motion sensor 18 against the tissue 19 and reduce acoustic crosstalk between the transducer probe 16 and motion sensor 18 through the sheet 20. The elastic biasing of the transducer probe 16 and motion sensor 18 may be augmented by the elastic cuff 12 which may engage the elastomeric sheet 20 at a series of edge holes 24 in the elastomeric sheet 20 gripped by corresponding hooks 23 on buckles attached to the elastic cuff 12.

Figure 2:
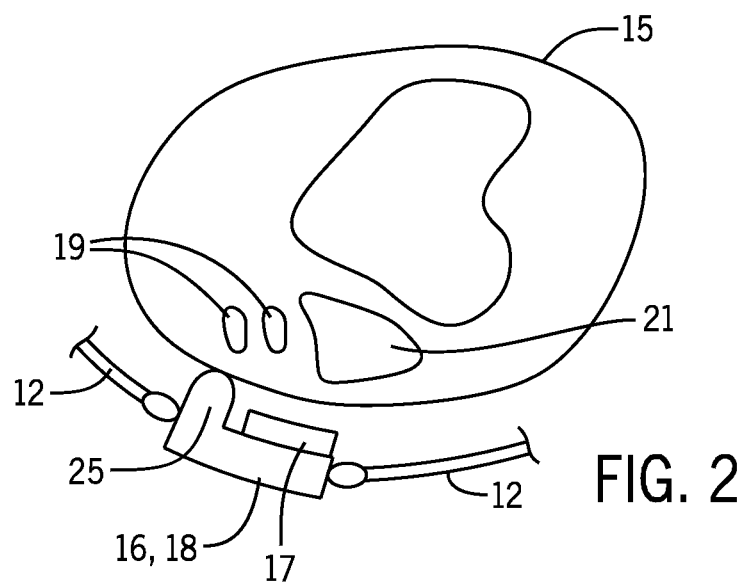
FIG. 2 is a simplified, planar cross-section through the ankle and peroneal tendon showing relative positioning of the transducer or motion sensor with an isolating foam pad and showing an optional sensor finger allowing the actuator or sensor assembly to make an isolated measurement of the tendon in the presence of an interfering structure such as the fibula.

Referring also to FIG. 2, a repositionable, sound dampening elastomeric foam pad 17 may be positioned between the individual 15 and portions of the transducer probe 16 and motion sensor 18 to isolate these portions from regions of the patient outside of the desired measurement region of interest, for example, the fibula 21. Optional protrusion 25 on one or both of the interfaces of the transducer probe 16 and motion sensor 18 may be provided to better couple with narrow connective tissue 19.

The transducer probe 16 will receive an electrical signal from a controller 26 to control a force applied by the transducer probe 16 to the connective tissue 19 as a function of time. In turn, the motion sensor 18 may provide electrical signals to the controller 26 whose magnitude indicates the resulting detected shear wave motion in the connective tissue 19. The transducer probe 16, for example, may be an electromagnetic actuator, for example, employing a voice coil design for good linearity, or the like. The motion sensor 18 may be an accelerometer, microphone, piezoelectric element, electromagnetic pickup, or the like. In one non-limiting example, the motion sensor 18 may be an accelerometer commercially manufactured by PCB Piezotronics of Depew, New York.

The controller 26 may include a processor 28 and computer memory 30, the latter holding a program 32 as will be described below. The controller 26 may also communicate with a user interface 43 providing an output display for outputting a measured force value and inputs such as a keyboard or touchscreen to provide controls to stop and start the tissue measuring apparatus 10 and provide other control parameters.

Figure 3:
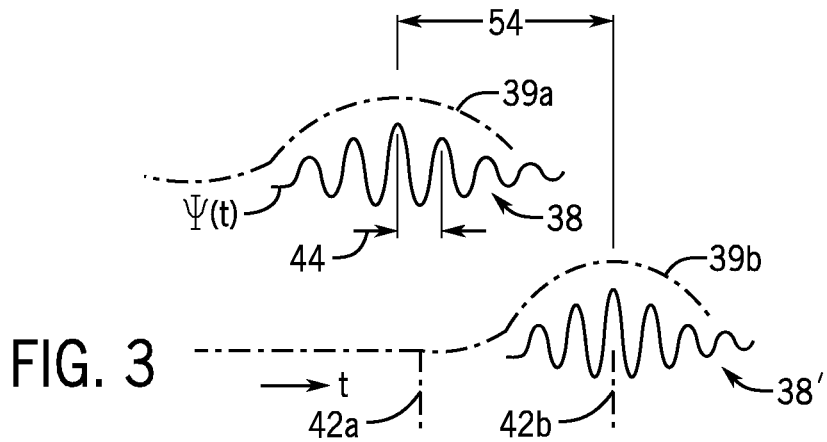
FIG. 3 is a simplified representation of a wavelet as transmitted and received, respectively, by the transducer and motion sensor, showing the wavelet envelope used to measure group delay.
Figure 5:
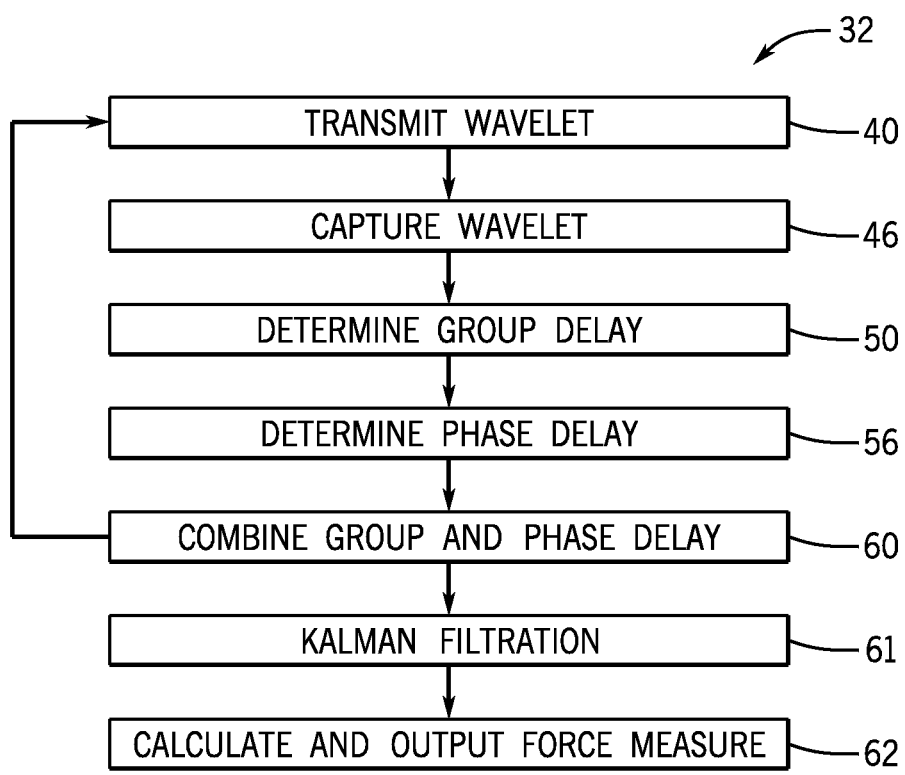
FIG. 5 is a flowchart of a program executed by the controller of FIG. 1 in providing output related to tissue force.

Referring now to FIGS. 3 and 5, during use of the tissue measuring apparatus 10, the controller 26 executing the stored program 32 per process block 40 may provide a wavelet signal 38 to the transducer probe 16 as positioned against the connective tissue 19. This wavelet signal 38 causes the transducer probe 16 to apply a transverse motion perpendicular to the axis 22 at a first location along the tissue 19 at a first transmission time 42a, to produce a shaped wavelet pulse. As used herein "wavelet" refers to a pre-defined band-limited signal of limited duration and, in one nonlimiting embodiment, may be a first sine wave amplitude modulated by a second lower frequency sine wave (for example, less than ⅕ the frequency of the first sine wave), for example, being a function ψ(t) as follows:

$$\psi(t) = \begin{cases} A \cdot \sin(\omega_A t) \cdot \sin(\omega_H t + \varphi) & \text{for } 0 \le t \le t_0 \\ 0 & \text{otherwise} \end{cases}$$

where A is an amplitude of the wavelet signal 38, $\omega_a$ is the wavelet frequency 44, and $\omega_H$ is the frequency of the modulating envelope 39a (termed the dominant frequency) which will generally be less than ⅕ or less than ⅐ of the wavelet frequency 44. In some nonlimiting examples, the wavelet frequency 44 will be from 1 to 3 kHz.

Generally, the duration of the wavelet signal 38 will be such as to provide at least three lobes and less than 10 lobes (cycles) of the wavelet. The wavelet signal 38 may be contrasted to an impulse or step signal in that it is composed of a narrower range of frequencies and thus less susceptible to resonance effects.

The wavelet signal 38 operating through the transducer probe 16 imparts a transversely oscillating shear wave to the tissue 19 traveling along the axis 22 to a second location at a predetermined distance from the location of the transducer probe 16. At this second location, the shear wave is detected by the motion sensor 18 as a received wavelet signal 38 as indicated by process block 46 of FIG. 5 at a second reception time 42b.

As indicated by process block 50, the envelope 39b of the received wavelet signal 38' may then be extracted, for example, through use of the Hilbert transform. This envelope extraction process is as described by T. J. Ulrich "Envelope Calculation from the Hilbert Transform" Mar. 17, 2006, as incorporated by reference. The envelope 39b may then be compared to the envelope 39a (for example, by cross correlation) to establish a group delay time 54 being the apparent delay between the envelopes of the wavelet signals 38 and 38'. This cross correlation process can be per Hernandez Crespo, B.; Courtney, C. R. P.; Engineer, B. Calculation of Guided Wave Dispersion Characteristics Using a Three-Transducer Measurement System. Appl. Sci. 2018, 8, 1253. https://doi.org/10.3390/app8081253 (incorporated by reference).

Figure 4:
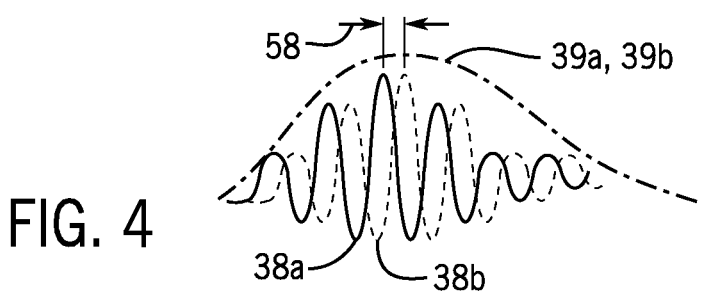
FIG. 4 is a simplified representation of the transmitted and received wavelets registered by their envelopes for determination of phase delay of the wavelet frequency.

As indicated by process block 56 and shown in FIG. 4, with the envelopes 39a and 39b registered in time, a phase delay time 58 may be determined as the relative shifting of the wavelet signals 38 and 38' within the aligned envelopes 39a and 39b. This relative shifting may again be determined by a cross-correlation process working on the wavelet signals 38 and 38' as registered in time.

Prior to this cross correlation of the envelopes 39, the wavelet signals 38 are corrected to account for any delay introduced by the transducer probe 16 in the generated shear wave with respect to the received wavelet signal 38. This correction time-shifts the wavelet signal 38 by a delay related to the frequency response function of the transducer probe, for example, determined empirically. Specifically, a correcting delay is determined by analyzing the transducer probe 16 with respect to its frequency response (characterized by amplitude and phase shift) and set equal to a determined phase lag at the wavelet frequency 44. The resulting wavelet signal 38 used for the analysis is thus shifted slightly later in time than the wavelet signal 38 provided to the transducer probe 16.

Process blocks 40, 46, 50, 56, and 60 may be repeated and the group delay time 54 and phase delay time 58 for each measurement provided to a Kalman filter per process block 61 to provide a running current value of the group delay time 54 and phase delay time 58. As will be understood in the art, a Kalman filter is an adaptive filter and used in this application to remove noise and other signal artifacts, for example, as described Schmitz, D et al., Sensors, 22(6): 2283, 2022 "A Kalman Filter Approach for Estimating Tendon Wave Speed from Skin-Mounted Accelerometers." incorporated by reference.

As indicated by process block 60, the group delay time 54 and phase delay time 58 may be combined, for example, by summing together the corresponding time values, and then divided by the predetermined known distance between the transducer probe 16 in the motion sensor 18 to deduce a shear wave speed.

At process block 62, this shear wave speed may be expressed as a force measurement, for example, a strain or tension (if the cross-sectional area of the connective tissue 19 is known) and output on the interface 43. This conversion may make use of empirically measured conversion values for known tissue types and may provide for the entry of cross-sectional areas by the user or from a table of stored values links to different tissue types. This conversion may be calibrated by using a secondary estimate of force measured simultaneously with wave speed during a controlled task. The shear wave speed may also be output on the interface 43.

Additional details of construction of such a system may be found in U.S. Pat. No. 10,631,775, and in US patent application 2019/0200900 entitled "Apparatus for Intraoperative Ligament Load Measurements" assigned to the assignee of the present application and also hereby incorporated by reference.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed. References to "controller" and "a processor" should be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

What we claim is:

1. An apparatus for measuring forces in connective tissue comprising:
   at least one support adapted to attach to an individual at a location of connective tissue;
   a transducer probe held by the at least one support and receiving a transmission waveform signal to generate a predefined excitation in the connective tissue at a transmission time to generate a shear wavelet that travels longitudinally along the connective tissue from a first location;

a motion sensor to detect a reception waveform signal of the wavelet in the tissue at a reception time at a second location separated by a predetermined longitudinal distance from the first location; and a processing circuit operating to determine a wavelet delay from the transmission waveform signal and the reception waveform signal and, based on the wavelet delay, output a measure of connective tissue force.

2. The apparatus of claim 1 wherein the wavelet delay is a function of a group delay describing transmission time of an envelope of the wavelet.

3. The apparatus of claim 2 wherein the measure of wavelet delay is further a function of phase delay between a transmission frequency component of the transmission waveform signal and a reception frequency component of the reception waveform signal.

4. The apparatus of claim 3 wherein the transmission frequency component and the reception frequency component are a wavelet frequency.

5. The apparatus of claim 1 wherein the processing circuit operates to repeatedly determine a series of wavelet delays from a corresponding series of transmission waveform signals and reception waveform signals and applies an adaptive filter to the wavelet delays to provide the measure of connective tissue force.

6. The apparatus of claim 5 wherein the adaptive filter is a Kalman filter.

7. The apparatus of claim 1 wherein the processing circuit further operates to adjust the transmission waveform signal to compensate for delays introduced by the transducer probe prior to determining wavelet delay.

8. The apparatus of claim 1 wherein the wavelet transmission signal is a multi-lobed, time-limited sine wave.

9. The apparatus of claim 1 wherein the measure of connective forces is selected from the group consisting of stress and tension.

10. A method of measuring forces in connective tissue comprising the steps of:

attaching a support to an individual at a location of connective tissue;

receiving a transmission waveform signal at a transducer probe held by the support to generate a predefined excitation in the connective tissue at a transmission time to generate a shear wavelet that travels longitudinally along the connective tissue from a first location;

detecting with a motion sensor held by the support, a reception waveform signal of the wavelet in the tissue at a reception time at a second location separated by a predetermined longitudinal distance from the first location; and determining a wavelet delay from the transmission waveform signal and the reception waveform signal; and outputting a measure of connective tissue force based on the wavelet delay.

11. The method of claim 10 wherein the wavelet delay is a function of a group delay describing transmission time of an envelope of the wavelet.

12. The method of claim 11 wherein the determining of the wavelet delay is further a function of phase delay between a given frequency component of the transmission waveform signal and a corresponding given frequency component of the reception waveform signal.

13. The method of claim 12 wherein the given frequency component and corresponding given frequency component are a wavelet frequency.

14. The method of claim 10 further including measuring a series of wavelet delays from a corresponding series of transmission waveform signals and reception waveform signals and applying an adaptive filter to the wavelet delays to provide the measure of connective tissue force.

15. The method of claim 14 wherein the adaptive filter is a Kalman filter.

16. The method of claim 10 further including adjusting the transmission waveform signal to compensate for delays introduced by a transducer probe generating the predefined excitation prior to determining wavelet delay.

17. The method of claim 10 wherein the wavelet transmission signal is a multi-lobed, time-limited sine wave.

18. The method of claim 10 wherein the measure of connective forces is selected from the group consisting of stress and tension.

* * * * *